US012497506B2

United States Patent
Inoue et al.

(10) Patent No.: US 12,497,506 B2
(45) Date of Patent: Dec. 16, 2025

(54) HEAT-SHRINKABLE POLYESTER-BASED FILM ROLL

(71) Applicant: TOYOBO CO., LTD., Osaka (JP)

(72) Inventors: Masafumi Inoue, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 905 days.

(21) Appl. No.: 17/772,054

(22) PCT Filed: Oct. 22, 2020

(86) PCT No.: PCT/JP2020/039726
§ 371 (c)(1),
(2) Date: Apr. 26, 2022

(87) PCT Pub. No.: WO2021/085301
PCT Pub. Date: May 6, 2021

(65) Prior Publication Data
US 2022/0403156 A1    Dec. 22, 2022

(30) Foreign Application Priority Data

Oct. 31, 2019    (JP) .................................. 2019-199026

(51) Int. Cl.
*C08L 67/02*    (2006.01)
*B29C 48/00*    (2019.01)
(Continued)

(52) U.S. Cl.
CPC .......... *C08L 67/02* (2013.01); *B29C 48/0018* (2019.02); *B29C 48/0022* (2019.02);
(Continued)

(58) Field of Classification Search
CPC .... B21D 26/033; B21D 26/047; B21D 53/88; B29B 7/42; B29B 7/603; B29B 17/00;
(Continued)

(56) References Cited

U.S. PATENT DOCUMENTS

| | | |
|---|---|---|
| 2009/0042024 A1 | 2/2009 | Fujii et al. |
| 2015/0259484 A1 | 9/2015 | Nakano et al. |
| 2021/0024708 A1 | 1/2021 | Ishimaru et al. |

FOREIGN PATENT DOCUMENTS

| | | | |
|---|---|---|---|
| EP | 1698461 A1 * | 9/2006 | ............. B32B 27/08 |
| EP | 1876019 A1 | 1/2008 | |

(Continued)

OTHER PUBLICATIONS

Japanese Patent Office, International Search Report in International Patent Application No. PCT/JP2020/039726 (Dec. 22, 2020).

(Continued)

*Primary Examiner* — Lawrence D Ferguson
(74) *Attorney, Agent, or Firm* — Leydig, Voit & Mayer, Ltd.

(57) ABSTRACT

The present invention aims to provide a heat-shrinkable polyester film roll having decreased generation of wrinkles or longitudinal shrink mark. The present invention provides a film roll of a heat shrinkable polyester film, wherein a polyester of the polyester film contains recycled raw material from a PET bottle and an acid component of the polyester comprises isophthalic acid, and the film roll satisfies a specific average value of a shrinkage, specific isophthalic acid ratio, and specific thickness unevenness.

4 Claims, 1 Drawing Sheet

(51) Int. Cl.
  *B29C 48/08* (2019.01)
  *B29C 48/88* (2019.01)
  *B29C 48/91* (2019.01)
  *B29C 71/02* (2006.01)
  *C08J 5/18* (2006.01)
  *B29K 67/00* (2006.01)
  *B29K 105/26* (2006.01)
  *B29L 7/00* (2006.01)

(52) U.S. Cl.
  CPC ............ *B29C 48/022* (2019.02); *B29C 48/08* (2019.02); *B29C 48/91* (2019.02); *B29C 48/9135* (2019.02); *B29C 71/02* (2013.01); *C08J 5/18* (2013.01); *B29C 2071/025* (2013.01); *B29K 2067/003* (2013.01); *B29K 2105/26* (2013.01); *B29L 2007/008* (2013.01); *C08J 2367/02* (2013.01); *C08J 2467/02* (2013.01); *C08L 2203/162* (2013.01); *C08L 2205/025* (2013.01); *C08L 2207/20* (2013.01)

(58) Field of Classification Search
  CPC .......... B29C 2071/025; B29C 48/0018; B29C 48/0022; B29C 48/022; B29C 48/08; B29C 48/2563; B29C 48/2567; B29C 48/277; B29C 48/288; B29C 48/91; B29C 48/9135; B29C 55/04; B29C 55/12; B29C 61/06; B29C 71/02; B29C 61/003; B29C 61/02; B29K 2067/003; B29K 2105/26; B29L 2007/008; B65D 23/0878; B65D 75/002; B65D 65/02; C08G 63/181; C08G 63/183; C08G 63/672; C08J 2367/02; C08J 2400/30; C08J 2467/02; C08J 5/18; C08L 2203/162; C08L 2205/025; C08L 2207/20; C08L 67/02; Y02P 20/143; B29D 7/01; B65H 75/00; Y02W 30/62; Y02W 30/80
  See application file for complete search history.

(56) References Cited

FOREIGN PATENT DOCUMENTS

| | | |
|---|---|---|
| JP | 5320737 B2 | 7/2013 |
| JP | 6402954 B2 | 10/2018 |
| JP | 2019-178236 A | 10/2019 |
| KR | 10-2015-0017778 A | 2/2015 |
| WO | 2019/188922 A1 | 10/2019 |

OTHER PUBLICATIONS

China National Intellectual Property Administration, Second Office Action in Chinese Patent Application No. 202080075367.3 (Nov. 6, 2023).
European Patent Office, Extended European Search Report in European Patent Application No. 20881942.5 (Oct. 31, 2023).
European Patent Office, Communication Pursuant to Rule 114(2) EPC (Notice of Third Party Observations) in European Patent Application No. 20881942.5 (Dec. 13, 2023).
Korean Intellectual Property Office, Notice of Third Party Observations in Korean Patent Application No. 10-2022-7016459 (Oct. 23, 2023).
China National Intellectual Property Administration, Office Action in Chinese Patent Application No. 202080075367.3 (May 16, 2024).
Intellectual Property India, Pre-grant Opposition in Indian Patent Application 202247029709 (Feb. 28, 2024).
China National Intellectual Property Administration, First Office Action in Chinese Patent Application No. 202080075367.3 (Apr. 23, 2023).
China National Intellectual Property Administration, Office Action in Chinese Patent Application No. 202080075367.3 (Jan. 24, 2025).
Intellectual Property India, Examination Report in Indian Patent Application No. 202247029709 (Mar. 4, 2025).
China National Intellectual Property Administration, Office Action in Chinese Patent Application No. 202080075367.3 (Aug. 30, 2024).
Intellctual Property India, Hearing Notice in Indian Patent Application No. 202247029709 (Oct. 14, 2025).

* cited by examiner

[Fig. 1]
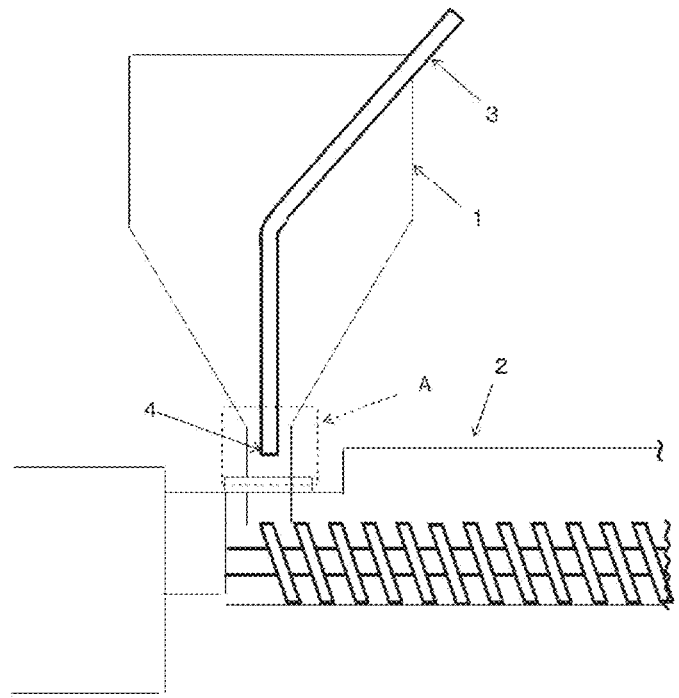
[Fig. 2]
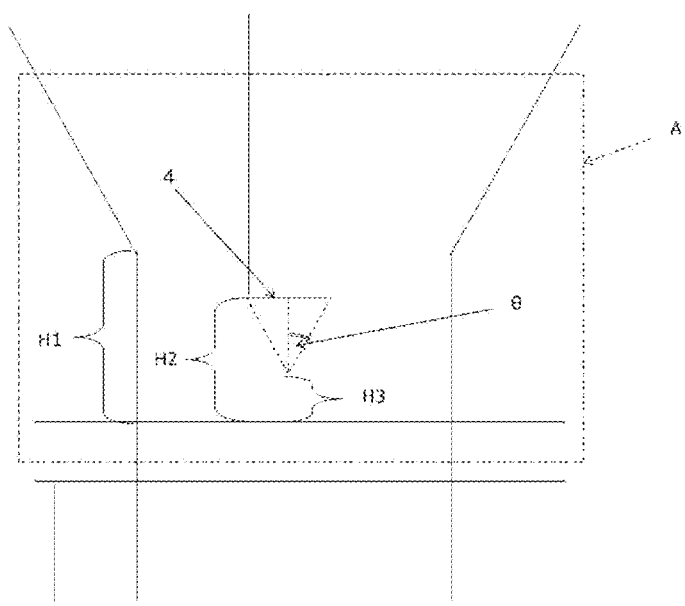

HEAT-SHRINKABLE POLYESTER-BASED FILM ROLL

TECHNICAL FIELD

The present invention relates to a film roll obtained by winding a heat-shrinkable polyester film. In particular, the present invention relates to a heat-shrinkable polyester film roll containing recycled raw material from a PET bottle. The film roll has high shrinkage and low fluctuation of shrinkage properties in the longitudinal direction of the film roll, as a result, the film roll has less defects such as shrinkage insufficiency, shrinkage unevenness, distortion, and longitudinal shrink mark in a post process.

BACKGROUND ART

In recent years, drawn film (so called heat-shrinkable film) made of polyvinyl chloride resin, polystyrene resin, polyester resin or other resins has been widely used for various use such as cap sealing, integrated packaging, and label packaging of a glass bottle or a PET bottle for the purpose of protecting the bottles and displaying products information. Among the above-mentioned heat-shrinkable film, polyvinyl chloride film has problems such as low heat resistance, and hydrogen chloride gas and dioxin generation during incineration. Also, polystyrene film has problems such as requiring a special composition ink for printing resulted from the film's poor solvent resistance, requiring high-temperature incineration, and generating black smoke accompanying malodor when disposed by burning. Considering these problems, polyester film has been widely used for heat-shrinkable film such as a shrinkable label since polyester film has high heat resistance, easiness of incineration, and excellent solvent resistance. The usage of polyester film has been on the increase with raised distribution amount of PET containers (PET bottles).

However, a drastic increase in the usage of PET bottles causes social challenges for increasing amount of waste and saving of natural resources. As one solution, a move of collecting used PET bottles (recycling) as a natural resource has been activated to address the challenges.

Known recycling technologies of PET bottles include mechanical recycling, chemical recycling, and thermal recycling. Mechanical recycling is the most prevailing among them. In the process of mechanical recycling, collected PET bottles are processed by sorting, crushing, washing, and then being formed as resin chip again by an extruder, and the re-formed resin chips are used to form fiber, film, or PET bottles.

In the production of heat-shrinkable polyester film, a partial use of the (recycled) raw material from a PET bottle can contribute to the life cycle of PET consisting of its production, use, and disposition. This contribution to the life cycle of PET leads to reduced environmental load as a result.

In general, a heat-shrinkable polyester film needs to have reduced crystallizability of the polyester forming the film to achieve high shrinkability, however, polyester of recycled raw material from a PET bottle is highly crystalline. Therefore, using recycled raw material from PET bottles requires mixing of highly amorphous raw material with at least two kinds of raw material.

A heat-shrinkable film is once wound as a roll after film production and then sent to a printing process in the shape of the film roll to be printed various patterns. After the printing process, the film roll is slitten to the size of a label of an end product according to the needs, and the film is formed into a tubular shape by solvent adhering overlaid left and right sides of the film. Then, the tubular shaped film is cut and processed to form a label or a bag. The label or a bag shaped film is mounted to a container and heat shrunk by steam spray inside of a shrinkage tunnel (hot air tunnel) while the film and the container is gone through the tunnel by a conveyor belt. After the whole process, a container having an adhesive heat-shrunk label is obtained.

By the way, if above mentioned label or bag shaped film show different heat shrinkage one by one during the heat shrinking process, that is, the heat shrinkage fluctuates dependent on pieces of the labels or the bags, some of them have improper heat shrinkage under the fixed heating conditions of the shrinkage tunnel. This fluctuation of heat shrinkage results in defects in appearance such as insufficient shrinkage, shrinkage unevenness, wrinkles, distortion of printed pattern, or longitudinal shrink mark, and the label or the bag having such defects cannot be used for the final products. Longitudinal shrink mark is the defect of label length irregularity occurring after shrinkage, curving of upper edge of the label downward in an arc, or curving of lower edge of the label upward in an arc is observed when the phenomenon occurs.

Heat shrinkage is largely affected by the fluctuation of composition of polyester forming longitudinal direction of the film of a film roll.

Generally, in the production of a heat-shrinkable polyester film, raw materials are supplied to an extruder and molten, the molten resin is extruded from a T-die to obtain an undrawn film, and the undrawn film is drawn to obtain a heat-shrinkable film. Fluctuation of composition is generated by the time raw chips are supplied to an extruder in the film production process, this means that the raw chips are not uniformly but unevenly mixed, allowing the fluctuation of polyester composition to occur.

Uneven distribution of raw materials is solved by using a raw material chip of single composition of necessary components (one kind of raw material chip). However, when a recycled raw material from a PET bottle is used as described above, at least two kinds of raw material chips must be mixed and used, and the mixing of some types of raw material chips has a risk of uneven distribution. As far as recycled raw material from a PET bottle is used, the use of recycled raw material from a PET bottle contains the risk of fluctuation of heat shrinkage in the longitudinal direction. Uneven distribution can be resolved, for example, by the addition of amorphous polyester to the polyester of recycled PET bottle at the step of re-chipping after crushing and washing of PET bottles in the recycling process, and single composition raw material chip of all the necessary components can be obtained. But this method is not realistic in that recycled raw material is used not only for film production but also for other purposes including film production.

Mostly, recycled raw material from a PET bottle is obtained by recycling various pet bottles randomly mixed. Not only is the molecular weight of recycled raw materials from PET bottles decreased due to repeated use, but also an additive such as nucleating agent is contained in the PET bottles in many cases. The inventors of the present invention found that, due to the nucleating agent and the decrease in molecular weight, uneven distribution of raw materials fluctuates blending amount of raw materials, undesirably, allowing the recycled raw material from a PET bottle to effect to the film properties more seriously than other raw materials.

Patent Document 1 discloses a heat-shrinkable polyester film obtained by using recycled raw material from a PET bottle, however, no description is found about the fluctuation of heat shrinkage in the longitudinal direction.

Patent Document 2 discloses a heat-shrinkable polyester film which contains recycled raw material from a PET bottle in high ratio. However, it's difficult to achieve shrinkage of 45% or more at 90° C. by the method described in the document, and there is no description about the heat shrinkage in the longitudinal direction.

PRIOR ART DOCUMENT

Patent Documents

Patent Document 1: Japanese Patent Publication No. 5320737
Patent Document 2: Japanese Patent Publication No. 6402954

SUMMARY OF THE INVENTION

Problems to be Solved by the Invention

The present invention aims to provide a heat-shrinkable polyester film roll having decreased generation of wrinkles or longitudinal shrink mark caused by the fluctuation of heat shrinkage in a film roll during the process of heat shrinkage, though recycled raw material from a PET bottle is used as a raw material for the production of the heat-shrinkable polyester film of the present invention.

Means to Solve the Problems

The inventors have completed the present invention as a result of the studies in order to solve above described problem. The present invention is consisted of the followings.

[1] A film roll of a heat shrinkable polyester film,
wherein a polyester of the polyester film contains 5 mass % or more and 50 mass % or less of recycled raw material from a PET bottle and an acid component of the polyester comprises isophthalic acid, and
the film roll satisfies the following requirements (1) to (3):
(1) an average value of a shrinkage in a main shrinkage direction of the film samples collected at every 100 m in a longitudinal direction of the film roll is 40% or more when the film samples are soaked in hot water of 90° C. for 10 seconds, and each of the shrinkage of the film samples is within ±3% of the average value;
(2) isophthalic acid ratio in 100 mol % of whole acid components contained in polyester constituting each of the film samples collected at every 100 m in a longitudinal direction of the film roll is within ±0.3 mol % of an average value of isophthalic acid ratio of all the film samples;
(3) the film roll satisfies thickness unevenness of 20% or less in the longitudinal direction of the film roll.
[2] The heat-shrinkable polyester film roll according to above [1], wherein the het-shrinkable polyester film comprises at least recycled raw material from the PET bottle and a mixture of one or more kinds of a polymer chip of different composition. [3] The heat-shrinkable polyester film roll according to above [1] or [2], wherein the polyester of the het-shrinkable polyester film comprises ethylene terephthalate as a main constituent component. [4]
The heat-shrinkable polyester film roll according to any one of above [1] to [3], wherein the average value of isophthalic acid ratio is 0.3 mol % or more and 3.0 mol % or less in 100 mol % of the whole acid components in polyester of the film samples collected at every 100 m in the longitudinal direction of the film roll.
[5] The heat-shrinkable polyester film roll according to any one of above [1] to [4], wherein a winding length of the heat-shrinkable polyester film roll is 1000 m or more.
[6] The heat-shrinkable polyester film roll according to any one of above [1] to [5], wherein an average value of a shrinkage in a direction orthogonal to the main shrinkage direction of the film samples collected at every 100 m in a longitudinal direction of the film roll is 0% or more and 15% or less when the film samples are soaked in hot water of 90° C. for 10 seconds, and each of the shrinkage of the film samples is within ±3% of the average value.

Effects of the Invention

A heat-shrinkable polyester film roll of the present invention has less fluctuation of heat shrinkage in a film roll, though recycled raw material from a PET bottle is mixed and used to obtain the film roll. Therefore, the heat-shrinkable polyester film roll of the present invention has extremely less generation of wrinkles or longitudinal shrink mark caused by the fluctuation of heat shrinkage.

BRIEF DESCRIPTION OF THE DRAWINGS

FIG. 1 is a schematic explanatory drawing of one example of the relationship between an inner pipe and extruder 2 equipped with hopper 1.
FIG. 2 is an enlarged drawing of A in FIG. 1.

MODE FOR CARRYING OUT THE INVENTION

Polyester used for the heat-shrinkable polyester film composing the heat-shrinkable polyester film roll of the present invention contains ethylene terephthalate as a main constituent component (herein after, the film may be referred to as the heat-shrinkable polyester film of the present invention). The film contains 50 mol % or more, or preferably 60 mol % or more of ethylene terephthalate to 100 mol % of whole polyester constituent components. As described later, the polyester contains isophthalic acid component. Examples of the dicarboxylic acids other than terephthalic acid and isophthalic acid comprising the polyester of the present invention include aromatic dicarboxylic acids such as naphthalenedicarboxylic acid and orthophthalic acid; aliphatic dicarboxylic acids such as adipic acid, azelaic acid, sebacic acid, and decanedicarboxylic acid; and alicyclic dicarboxylic acid.

When the aliphatic dicarboxylic acid such as adipic acid, sebacic acid, or decanedicarboxylic acid is contained, the content rate of the aliphatic dicarboxylic acid is preferably less than 3 mol %. Film stiffness of the heat-shrinkable polyester film becomes insufficient by using the polyester containing 3 mol % or more of these aliphatic dicarboxylic acids, and this insufficient stiffness causes defects during slitting or post processing.

Polycarboxylic acids having a valence of 3 or greater such as trimellitic acid, pyromellitic acid, and anhydride thereof are not preferably contained. For the heat-shrinkable polyester film obtained by using the polyester containing these polycarboxylic acids mentioned above, desired high shrinkage is hard to be achieved.

Examples of diol components other than ethylene glycol composing the polyester used for the present invention include aliphatic diols such as 1-3 propanediol, 1-4 butanediol, neopentyl glycol, and hexane diol; an alicyclic diol such as 1,4-cyclohexanedimethanol; an aromatic diol such as bisphenol A; and diethylene glycol.

As the polyester used for the heat-shrinkable polyester film of the present invention, polyester having adjusted glass transition point (Tg) to the range from 60 to 80° C. is preferably used by containing one or more kinds of compound selected from a group consisting of cyclic diol such as 1,4-cyclohexanedimethanol, and $C_{3-6}$ diol such as 1-3 propanediol, 1-4 butanediol, neopentyl glycol, hexane diol, or diethylene glycol.

In the polyester used for the heat-shrinkable polyester film of the present invention, the amount of one or more kinds of monomer component which can be an amorphous component is preferably 14 mol % or more, more preferably 16 mol % or more, and particularly preferably 18 mol % or more in 100 mol % of polyhydric alcohol components or in 100 mol % of polycarboxylic acids in the whole polyester resin. Examples of the monomers which can be amorphous components include neopentylglycol, 1,4-cyclohexanedimethanol, 1,4-cyclohexanedicarboxylic acid, 2,6-naphthalenedicarboxylic acid, 2,2-diethyl1,3-propanediol, 2-n-butyl-2-ethyl-1,3-propanediol, 2,2-isopropyl-1,3-propanediol, 2,2-di-n-butyl-1,3-propanediol, 1,4-butanediol, and hexanediol. Among them, neopentyl glycol or 1,4-cyclohexanedimethanol is preferably used. Upper limit of the total monomer components which can be amorphous components is preferably 40 mol % or less, more preferably 38 mol % or less, and further preferably 36 mol % or less.

In the polyester used for the heat-shrinkable polyester film of the present invention, diol having 8 or more numbers of carbons such as octanediol, or polyhydric alcohols having the valence of 3 or greater such as trimethylolpropane, trimethylolethane, glycerine, and diglycerine are not preferably contained. When the polyester containing these diols and polyhydric alcohols are used, it becomes difficult for the heat-shrinkable polyester film to achieve desired high shrinkage ratio.

Intrinsic viscosity of the heat-shrinkable polyester film of the present invention is preferably 0.55 dl/g or more and 1.50 dl/g or less. When the intrinsic viscosity is less than 0.55 dl/g, film strength is extremely decreased, and undesirably, film may be easily ruptured at the time of film production or processing. When the intrinsic viscosity is more than 1.50 dl/g, film becomes hard to be drawn, and undesirable rupture of film may be occurred. Intrinsic viscosity is more preferably 0.58 dl/g or more and 1.47 dl/g or less, and further preferably 0.61 dl/g or more and 1.44 dl/g or less.

A resin forming the heat-shrinkable polyester film of the present invention can contain additives, as needed, such as wax, antioxidant, antistatic agent, crystal-nucleation agent, viscosity reducing agent, heat stabilizer, pigment for coloring, color protection agent, and ultraviolet absorber. Also into the resin forming the heat-shrinkable polyester film of the present invention, fine particles may preferably be added as a lubricant to improve the workability (slipperiness) of the polyethylene terephthalate resin film. Although any fine particles may be added, the following inorganic fine particles such as silica, alumina, titanium dioxide, calcium carbonate, kaolin, and barium sulfate can be mentioned as examples. The fine particles are also exemplified by the following organic particles such as acrylic resin particles, melamine resin particles, silicone resin particles, and cross-linked polystyrene particles. The average diameter of the particles is arbitrarily selected as needed within the range of 0.05 to 3.0 μm measured by a Coulter counter. The fine particles are added within the range of 300 to 1200 ppm, and thus obtained film can have both of good slipperiness (friction) and transparency.

Above-described particles may be added into the resin forming the heat-shrinkable polyester film by adding the particles at any stages of the reactions in the production of polyester resin. The particles are added as a slurry dispersed in ethylene glycol preferably to promote polycondensation reaction at the stage of esterification or after the completion of transesterification reaction which comes before the start of polycondensation reaction. Further, above-described particles are added preferably by the method of blending a slurry of particles dispersed in ethylene glycol or water with polyester resin raw material using a kneading extruder equipped with a vent, or the method of blending dried particles with polyester resin raw material using a kneading extruder.

Further, the heat-shrinkable polyester film of the present invention may be subjected to corona treatment, coating treatment, or flame treatment to have good surface adhesiveness.

The heat-shrinkable polyester film of the present invention contains 5 mass % or more and 50 mass % or less of recycled raw material from a PET bottle. When the content amount is less than 5 mass %, the film can contribute to reduce environmental load only a little, so the present invention seems not to be effective to reduce the environmental load. When more than 50 mass % of the recycled raw material is used, raw materials other than recycled raw material from a PET bottle are required to be extremely highly amorphous, that is, the amount of amorphous components needs to be extremely high. However, higher amount of amorphous component requires longer time of polymerization of raw materials, and it's not preferable in terms of cost. The content amount of recycled raw material from a PET bottle is more preferably 10 mass % or more and 45 mass % or less, and further preferably 20 mass % or more and 40 mass % or less.

An average value of shrinkage in the main shrinkage direction of the film samples collected at every 100 m in the longitudinal direction of the film roll is 40% or more when the film samples are soaked in hot water of 90° C. (hot-water shrinkage at 90° C.), and each of the shrinkage of the film samples is within ±3% of the average value.

Hot water shrinkage is calculated according to the formula 1 from the film length before and after shrinkage when the film sample is treated in hot water of 90° C. for 10 seconds with no load.

$$\text{Heat shrinkage} = \{(\text{length before shrinkage} - \text{length after shrinkage})/\text{length before shrinkage}\} \times 100\ (\%) \quad \text{Formula 1:}$$

When the average value of the heat shrinkage is less than 40%, shrinkage is small, and thus obtained film is not preferable as a heat-shrinkable film because of wrinkles or insufficient shrinkage of label generated after shrinkage. The upper limit of shrinkage may be 80% or so, though the upper limit is not particularly restricted. When the shrinkage of the pieces of film sampled at every 100 m of a film roll is beyond the range of an average value±3% and the film is made to a label, shrinkage of each label largely varies, and the shrinkage fluctuation is likely to generate a label of poor appearance, for example a label with wrinkles, after finished in a shrinkage tunnel. The shrinkage is more preferably an average value±2.5%, further preferably an average value±2.0%, and particularly preferably an average value±1.5% or less, and the most preferably an average value±1.0% or less.

Shrinkage in the direction orthogonal to the main shrinkage direction of the film samples collected at every 100 m in the longitudinal direction of the film roll is within ±3% of an average value when the film samples are soaked in hot water of 90° C. (hot-water shrinkage at 90° C.) When the shrinkage of the film sampled at every 100 m of a film roll is beyond the range of an average value±3% in the direction orthogonal to the main shrinkage direction and the film is made to a film, shrinkage of each label largely varies, and the shrinkage fluctuation is likely to generate height irregularity of label after finished using a shrinkage tunnel. The shrinkage is more preferably an average value±2.5%, further preferably an average value±2.0%, and particularly preferably an average value±1.5% or less, and the most preferably an average value±1.0% or less. The upper limit of the average value of the shrinkage in the direction orthogonal to the main shrinkage direction is 20% for all the sample film. When the average value is larger than 20%, undesirably, large longitudinal shrink mark shows up at the time of shrinkage finishing. The upper limit of the average value is more preferably 17% or less, and further preferably 14% or less. The lower the shrinkage in the direction orthogonal to the main shrinkage direction is, the more preferable it is.

The heat-shrinkable polyester film roll of the present invention is sampled at every 100 m in the longitudinal direction, and each of the film samples has isophthalic acid ratio of preferably an average value±0.3 mol % or less in 100 mol % of whole acid components contained in polyester. Isophthalic acid ratio is measured and calculated using NMR as described later.

When isophthalic acid ratio fluctuates beyond the range of an average value±0.3 mol %, the fluctuation of the composition accompanies large fluctuation of heat shrinkage. As a result, shrinkage of labels varies when the pieces of the film samples are made to the labels, and undesirably, poor appearance such as wrinkle is generated more easily.

Recycled raw material from a PET bottle is used for the film roll of the present invention, and generally, recycled raw material from a PET bottle contains small amount of isophthalic acid as an acid component as described later. Fluctuation of isophthalic acid ratio means uneven distribution of raw material chips of recycled raw material from a PET bottle and other raw material chips. As described above, recycled raw material from a PET bottle contains an additive such as nucleating agent in many cases. In addition, molecular weight is decreased due to repeated use of PET bottles, therefore, the effect of fluctuation of physical properties caused by uneven distribution is large compared to other raw materials. The method by which uneven distribution of raw materials can be decreased is described later.

Isophthalic acid ratio is more preferably an average value±0.2 mol %, and further preferably an average value±0.1 mol %.

The average of the isophthalic acid ratio described above is 0.3 mol % or more and 3.0 mol % or less in 100 mol % of whole acid components contained in polyester. Crystallinity of polyester used for a PET bottle is controlled to obtain a good appearance of a bottle, and polyester containing 10 mol % or less of isophthalic acid is generally used. In the present invention, recycled raw material from a PET bottle is contained in an amount of 50 mass % or less, therefore, the upper limit of the average value of isophthalic acid ratio is preferably 3.0 mol % or less. The upper limit of the average value is more preferably 2.8 mol % or less, further preferably 2.6 mol % or less, and particularly preferably 2.4 mol % or less.

The lower limit of the average value of isophthalic acid ratio is preferably 0.3 mol %, more preferably 0.4 mol %, further preferably 0.5 mol %, and particularly preferably 0.6 mol %.

The thickness unevenness in the longitudinal direction of the heat-shrinkable polyester film roll of the present invention is 20% or less when calculated according to the formula 2. Thickness unevenness of film in the longitudinal direction causes labels to have thickness irregularity when the labels are made from the film. When labels have thickness irregularity with each other, the labels are not equally heated in a steam tunnel (hot air tunnel) under the fixed heating condition, and the labels with poor appearance such as wrinkles is undesirably generated. The thickness unevenness is preferably 18% or less, and further preferably 15% or less. The smaller the thickness unevenness is, the better it is.

$$\text{Thickness unevenness} = \{(\text{maximum thickness}) - (\text{minimum thickness})/\text{average thickness}\} \times 100 \, (\%) \quad \text{Formula 2:}$$

Thickness of the heat-shrinkable polyester film of the present invention is preferably 5 μm or more and 40 μm or less. The risk of rupture in film production increases when the thickness is less than 5 μm. In addition, with the film thickness less than 5 μm, stiffness of the film is decreased when made to a label, and wrinkles are undesirably likely to be generated. When film is thicker, the process of film production becomes stable and film stiffness increases, so troubles such as wrinkles become decreased, however, increasing of film thickness is not preferable in terms of volume reduction of film and the aim of the present invention of reducing environmental load. The film thickness is more preferably 8 μm or more and 37 μm or less, and further preferably 11 μm or more and 34 μm or less.

Width of the heat-shrinkable polyester film roll of the present invention is preferably 500 mm or more, further preferably 1000 mm or more, and particularly preferably 1500 mm or more. The winding length of the film roll is preferably 2000 m or more, further preferably 4000 m or more, and particularly preferably 8000 m or more.

Hereinafter, preferable production method for the heat-shrinkable polyester film roll of the present invention will be described.

The production method for the heat-shrinkable polyester film roll of the present invention includes the following processes; the process of storage and supply of resin raw materials; molten extrusion process of resin; the process to form undrawn sheet from extruded resin; drawing process of the undrawn sheet; winding process of the obtained drawn film.

Importantly, fluctuation of film composition needs to be reduced to obtain the heat-shrinkable polyester film roll of the present invention, and the method to reduce the fluctuation will be specifically described later.

Method for Reducing Fluctuation of Film Composition

Generally, heat-shrinkable film requires to contain amorphous component as a raw material. Since the heat-shrinkable polyester film of the present invention is obtained by using recycled raw material from a PET bottle, inevitably, two or more kinds of raw material chips including recycled raw material from a PET bottle are used. When two or more kinds of raw material chips are used, "blending method" is generally employed, but the method often involves uneven distribution of raw material chips. In the present invention, the methods described below and the combinations of the methods are preferably employed to reduce uneven distribution of raw material chips caused by the blending method.

(a) Uniformizing of Chip Shape

In the blending method, some kinds of polyester raw material chips of different composition are blended inside of a hopper and molten kneaded, and the resin raw material is extruded from an extruder to obtain film. In the present invention, recycled raw material chip from a PET bottle and other amorphous raw material chips are continuously or intermittently supplied to and mixed inside of a hopper, and finally, mixed raw chips are supplied to the hopper (an end hopper) placed just above an extruder. Raw material is supplied from a hopper in accordance with the discharge rate of the extruder, and film is formed.

However, mixing ratio of raw material chips supplied to a subsequent hopper or a subsequent extruder differs dependent on the volume or a shape of a raw material mixing hopper or an end hopper, especially when the amount of raw material chips inside of a hopper is a lot or little.

This problem becomes remarkably obvious when kinds of polyester raw chips have different shapes and specific gravity. As a result, this difference in the shape and specific gravity leads to fluctuation of isophthalic acid ratio in the present invention.

For the purpose of obtaining the film roll having less fluctuation of isophthalic acid ratio and shrinkage in the longitudinal direction, that is, the film roll of the present invention, fluctuation of polyester composition forming a film needs to be reduced by uniformizing the shape of raw material chips, and uneven distribution of raw materials inside of a hopper can be decreased.

Generally, molten state polyester raw chips are taken in the shape of strand from a polymerizer after polymerization. Then, the polyester is promptly water cooled and shaped as chips by cutting with a strand cutter. When recycled raw material from a PET bottle is used, flake shaped polyester obtained by selecting, crushing, and washing collected PET bottle is extruded again using an extruder and taken in the shape of strand. Then the strand shaped polyester is promptly water cooled and shaped as chips by cutting using a strand cutter. Thus obtained polyester chips usually have the shape of elliptic cylinder of oval cross section. The size of the polyester chips are preferably within the range of ±20% of average values of long diameter (mm), short diameter (mm), and chip length (mm) of the oval cross section. More preferably, the size is within the range of ±15% of each average value. The long diameter and the short diameter can be adjusted by the size of the nozzle holes of a T-die used to extrude raw materials in the shape of strand. Chip length can be adjusted by regulating discharge amount of strand, conveyance speed of strand, and rotation speed of a strand cutter.

Size difference between chips allows smaller chips to drop earlier than ones of larger size when mixture of chips move inside of a hopper to fall down from it. When residual quantity of chips inside of a hopper is little, the ratio of larger seized chips becomes high, and uneven distribution of raw materials is caused. However, by using the chips sized within the range above describe, this uneven distribution of raw materials can be reduced.

Angle of repose is used to indicate flowability of grains, raw material chips in the present invention, and the flowability means if the grains are easily dropped or not. Angle of repose is the internal angle between the horizontal surface and the surface of the pile formed by pouring a certain amount of raw material chips from a predetermined height. The angle is affected by the shape and the diameter of the raw material chips, the smaller the size of the chips is, the smaller the angle becomes, that is, the smaller the angle is, the more easily the resin chips fall down. Difference of angle of repose is preferably 5° or smaller between the chips having the biggest angle of repose and the smallest the angle of repose. By using the chips having angle of repose within the range above described, uneven distribution of raw materials can be reduced. More preferably, the angle difference is 4° or smaller.

(b) Optimization of Hopper Shape

A hopper shape can be optimized as a preferable method to solve the problem of uneven distribution of raw materials. As a hopper to store mixed resin inside, a funnel-shaped hopper can be mentioned. The funnel-shaped hopper can have inclination angle adjusted to 65° or larger to solve the uneven distribution, for larger sized chips are allowed to fall down as easily as smaller sized chips by using such a hopper. By using the funnel-shaped hopper, the contents, mixed resin, goes down in a hopper keeping the top end line horizontal, and uneven distribution of raw materials is effectively reduced. The inclination angle is more preferably 70° or larger. Inclination angle of a hopper is the angle formed by a hypotenuse of a funnel-shaped hopper and a horizontal line.

(c) Optimization of Hopper Volume

Optimizing hopper volume is a preferable method to reduce uneven distribution of raw materials inside of a hopper. Appropriate volume of a hopper is within the range of 15 to 120 mass % of the discharge amount of an extruder per hour. Stable supply of raw materials becomes difficult if a hopper does not have the volume of 15 mass % or larger than the discharge volume of raw chips. On the other hand, an oversized hopper allows raw chip mixture to stay in the hopper over a long time, and uneven distribution of the raw material chips may be caused while the chips are staying in the hopper. Due to the reasons above mentioned, the hopper volume needs to be within the range above described. More preferably, the hopper volume is within 20 to 100 mass % of the discharge volume of raw materials from an extruder per hour.

(d) Reduction of Fine Powder

Another preferable way to decrease the uneven distribution of raw material is to reduce the ratio of fine powder generated by scraped raw material chips. The powder intrudes between the chips, and this phenomenon encourages uneven distribution of raw materials since the reduced friction between the chips make it easier for the smaller sized chips to fall down from a hopper. The ratio of fine powder contained in a hopper is preferably decreased by removing the powder generated in the process the fine powder may be generated. The ratio of the fine powder is preferably controlled to be 1 mass % or less throughout the process in which raw material chips are contained in an extruder, and more preferably the ratio is controlled within 0.5 mass % or less.

Specifically, the powder is removed by using a sieve at the time of chip forming by a strand cutter or by using a cyclone type air filter when raw chips is air conveyed.

(e) Usage of Uncrystallized Raw Materials

A large difference in specific gravity among raw material chips is likely to generate uneven distribution of raw material. Chips having heavy specific gravity (heavy chip) may drop faster than other chips when mixed raw material chips are dropped from a hopper, and this difference in specific gravity encourages uneven distribution of raw chips. Though raw material chips from a recycled PET bottle is used as a mixture with amorphous raw material chips in the present invention, there is a difference of specific gravity between both kinds of raw chips, for recycled raw material from a PET bottle is crystalline and has heavier specific gravity than amorphous raw material chips.

Raw material chips are subjected to a drying process to reduce water contained in the resin before being supplied to an extruder, or the raw material chips are separately dried before being supplied to a hopper. The chips of recycled raw material from a PET bottle is dried by heating up to around 160° C. to shorten the time for drying, however, this method of drying involves crystalline of polyester, and specific gravity of the raw material chips increases compared to the raw material chips before drying. This increase in specific gravity allows the difference of specific gravity to be larger between heat dried recycled raw material chips from a PET bottle and amorphous raw chips.

Therefore, raw material chips used in the present invention is dried without being crystallized by preferably employing vacuum drawing at room temperature to reduce moisture content. Or drying process itself is not carried out in the present invention, that is, uncrystallized raw material chips is used. In this case, water is removed from a vent during the process of molten extrusion carried out preferably by employing a twin screw extruder equipped with a vent.

(f) Agitation Inside of Hopper

By agitating inside of a hopper containing mixed raw material chips, uneven distribution of raw materials can be effectively reduced. Uneven distribution of raw materials can be reduced by placing agitation devices equipped with a blade or a helical ribbon blade in a hopper, for resin can be supplied to next processes (a hopper or an extruder) while being mixed by agitation. The location of the hopper having an agitation function is not particularly restricted. The hopper is preferably located near an extruder, or more preferably raw materials are agitated in the end hopper placed right above an extruder.

(g) Installation of Cone Baffle

Falling down of raw material chips existing at lower part of a hopper is effected by the pressure (so called powder pressure) caused by the weight of raw material chips existing at upper part of a hopper.

Generally, film is produced continuously, but raw material chips are intermittently supplied to a hopper in many cases. Continuous supply of resin raw materials requires a chip conveying apparatus to be always kept in an operating status, and this full-time operating of the apparatus increases failure frequency. In addition, the supply volume of raw materials needs to be in balance with the consumption volume of them, but an accurate measurement of the volume is impossible when small amount of resin chip is supplied. Intermittent supply is a cycle of provision of raw materials, raw materials inside of a hopper is consumed, the volume of the raw materials fall below a certain volume level, a certain amount of raw material chip is supplied, the supply is stopped when the amount reaches a certain level, and raw materials are supplied again with the consumption goes on. In this case, the level of hopper volume always changes with the changes of powder pressure to the contents of the lower part of a hopper. Fluctuation of powder pressure is not preferable, for the fluctuated pressure increases uneven distribution of raw materials.

To solve the problem above mentioned, a cone baffle (Jingasa) is preferably placed at a lower part of a hopper to cut the pressure from the raw chips existing at an upper part of the hopper. The lowest volume level of raw materials inside of a hopper is set to the higher position than the cone baffle, allowing powder pressure to raw chips existing at lower position than the cone baffle can be kept fixed and fluctuation of raw materials can be reduced.

Though the shape of the cone baffle is not particularly restricted, ones of a cone or delta cone shape is preferable.

(h) Mixing of Raw Material Chips Right Before Supplied to Extruder

A pipe can be inserted into inside of a hopper placed right above an extruder (an end hopper) to mix chips right before extrusion, and this is another preferable method for mixing of raw materials. Raw material chips inside of a hopper often causes uneven distribution, but raw material chips are mixed just before being supplied to an extruder in this method. By employing this method, uneven distribution is effectively decreased since uneven distribution itself is hardly to occur. However, the equipment at least satisfying the following formula 3 needs to be used to employ this method. An example of a specific mixing procedure is shown in FIG. 1. FIG. 1 is a schematic drawing of a relationship between extruder 2 equipped with hopper 1 and an inner pipe. FIG. 2 shows enlarged view of A part in above mentioned FIG. 1. As shown in FIGS. 1 and 2, raw material chips to be mixed are supplied from inner pipe 3, and other raw materials are supplied from upper part of hopper 1. Since outlet 4 of inner pipe 3 is placed right above an extruder (exactly right above raw materials supply port 5 of extruder 2), mixing ratio of raw material chips mixture can be kept constant.

The height ($H2$) of above-described outlet 4 of inner pipe 3 preferably satisfies the following formula 3, and more preferably $H2$ satisfies both of the formulas 3 and 4.

$$H2<H1 \quad \text{Formula 3:}$$

(In the formula, $H1$ is the height of the vertical part of hopper's inside wall. (See FIG. 2))

$$0.5 \times L/\tan\theta < H2 \quad \text{Formula 4:}$$

(In the formula, $L$ is the inner diameter of outlet 4 of inner pipe 3 (See FIG. 2). $\theta$ is a repose angle of the raw material chips stored in a hopper before mixing of raw material chips.)

The position at which raw material chips are mixed ($H3$) can be set to the place higher than an extruder by satisfying the formula 3, and generation of air bubbles by the intrusion of air into an extruder can be prevented.

The height of the mixing position of raw material chips $H3$ ($=H2-0.5 \times L/\tan\theta$) is preferably higher than 0 m and shorter than 2 m. When the position is higher than 0 m, air intrusion into an extruder is preferably prevented. Also, when the height is shorter than 2 m, the distance to an extruder can be shorten, and uneven distribution of raw materials can be prevented. The height $H3$ is preferably 0.3 m or higher and 1.7 m or shorter, and further preferably 0.6 m or higher and 1.4 m or shorter.

When the blending method is employed, all the above described processes (a) to (d) are preferably carried out during the film roll production process to obtain the film roll of the present invention having small fluctuation of isophthalic acid ratio and heat shrinkage in the longitudinal direction. However, the execution of all of the processes (a) to (d) is insufficient to reduce uneven distribution of raw materials, further, one or more methods from the four methods (e) to (h) are preferably employed, and two of them are more preferably employed.

Instead of employing above described the blending method, the following method (i) may be employed.

(i) Use of Twin Screw Extruder and Side Feeder

Besides the methods above described, the method using a twin screw extruder and a side feeder is preferably used as the method which allows raw chips to be used without being blended.

Specifically, in the use of the amorphous raw material chips and recycled raw material chips from a PET bottle, the amorphous raw material chips are supplied to and molten in twin screw extruder 1, and the recycled raw material chips from a PET bottle are supplied to and molten in another extruder (hereinafter the extruder is referred to as twin screw extruder 2). The molten recycled raw material chips from a PET bottle are directly introduced in the middle of twin screw extruder 1 via a pipe by the method of side feed, and the two kinds of raw materials are preferably mixed inside of twin screw extruder 1.

This method does not include mixing process of raw materials in the state of chips, therefore, the fear of uneven distribution of raw material chips is essentially resolved.

With respect to the mixing ratio of raw materials, the amount of raw material chips supplied to twin screw extruder (side feeder) can be accurately adjusted by the rotation speed of a screw feeder. Therefore, fluctuation of film in the longitudinal direction can be extremely reduced.

Preferably, twin screw extruder 1 has vent function. A vent is preferably provided for deaeration at the starting position of raw material mixing, and the vent can prevent air bubble intrusion generated when raw materials are supplied from a side feeder.

Preferably, one kind of raw material chips is respectively supplied to twin screw extruder 1 and 2 to omit mixing process of raw material chips before being supplied to an extruder. By employing this method, the problem of uneven distribution of raw material chips are essentially resolved.

When 3 or more kinds of raw materials are used, another twin screw extruder 3 is further provided, and raw materials are directly introduced to twin screw extruder 1 preferably by side feeding.

Production process of the heat-shrinkable polyester film of the present invention includes the following steps; (1) molten extrusion and casting of undrawn sheet, (2) lateral drawing process of the undrawn sheet, (3) final heat treatment process. Detailed descriptions of the processes are as follows.

(1) Molten Extrusion and Casting of Undrawn Sheet

A sheet is obtained by extruding mixed raw materials from an extruder at the extrusion temperature ranged from 220 to 280° C. and employing the existing method such as T-die method or tubular method, in this process, uneven distribution of raw materials can be controlled by employing above described mixing and supplying method of raw materials When the temperature of polyester resin at the time of extrusion is higher than 280° C., intrinsic viscosity of polyester resin is decreased, allowing rupture of film to be generated during the process of film production. Undesirably, this phenomenon occurring due to the extrusion temperature higher than 280° C. makes it difficult to obtain steady-state film. If the temperature at the time of extrusion is lower than 220° C., a part of raw material is not molten due to the low temperature, and an overload is applied to a machine such as an extruder as a result. Or, undesirably, the unmelted resin itself becomes the origin of rupture during film production.

Then, the molten extruded film is quenched to obtain undrawn film. Molten resin is quenched by casting the resin on a rotating drum from a spinneret for quenching solidification, and substantially unoriented resin sheet is preferably obtained.

Molten resin is discharged from a mouth part of a T-die at a shear rate of 100 sec$^{-1}$ or higher, or more preferably 150 sec$^{-1}$ or higher. Fluctuation of shrinkage in the longitudinal direction and thickness unevenness are reduced when shear rate is higher, for resin discharging pressure becomes stable at a mouth part (outlet) of a T-die with the higher shear rate. When the shear rate is lower than 100 sec$^{-1}$, resin discharging pressure becomes unstable, and surging, fluctuation of thickness of undrawn film in the longitudinal, is likely to occur. Due to the surging, film is not drawn uniformly in the longitudinal direction, and fluctuation of heats shrinkage and thickness unevenness in the longitudinal direction becomes large.

When the shear rate is 600 sec$^{-1}$ or higher, not only is the intrinsic viscosity decreased due to the cleavage (degradation) of molecular chains of polyester, but also productivity of film becomes poor due to resin waste attached to the discharging part of a T-die.

Shear rate at an outlet of a T-die is calculated according to the following formula 5.

$$\gamma = 6Q/(W \times H2)$$ Formula 5:

γ: shear rate (sec$^{-1}$)
Q: discharge amount of raw materials from extruder (cm$^3$/sec)
W: width of mouth part of T-die (cm)
H: intervals of mouth part of T-die (lip gap) (cm)

(2) Lateral Drawing

Film is preferably drawn horizontally and monoaxially, that is, drawn only in the width direction. Though film may be longitudinally drawn before lateral drawing, the method is not preferable because manufacturing machine becomes huge. The undrawn sheet obtained as described above is introduced to a tenter, and the sheet is heated in a tenter in the state that both ends of the film is grasped by clips. Then the sheet is heated to the prescribed temperature by hot air in the preheating process.

A drawing process comes after the preheating process, and the film is drawn by widening the distance between the clips while the film is being conveyed in the longitudinal direction.

Film temperature at the time of drawing in the width direction is preferably film Tg+5° C. or higher to Tg+40° C. When the film temperature is lower than Tg+5° C., undesirably, the drawing force of film becomes too high with the increase in the risk of rupture. When the film temperature is higher than Tg+40° C., undesirably, the drawing force becomes too low, and sufficient shrinkage is not bestowed to the film.

(3) Final Heat Treatment Process

Laterally drawn film is subjected to the final heat treatment in a tenter. In a tenter, both ends of the film in the width direction are grasped by clips, and the film is preferably heated at the temperature of +5° C. or higher and 45° C. or lower than the temperature of lateral drawing for the time of 5 seconds or longer and 10 seconds or shorter.

When the temperature exceeds the temperature of lateral drawing+45° C., undesirably, shrinkage in the width direction decreases and required shrinkage property is not achieved. Also, when the temperature is lower than the temperature of lateral drawing+5° C., the shrinkage, natural shrinkage, of final product in the width direction becomes undesirably large with time during the storage under room temperature. Though longer time for heat treatment is preferable, the time is preferably 10 seconds or shorter, for longer period of heat treatment requires large equipment.

In terms of reducing fluctuation of heat shrinkage, fluctuation of the surface temperature of film is controlled preferably within an average temperature±1° C., and more preferably within an average temperature±0.5° C. at any measurement points of each steps, preheating, drawing, and final heat treatment steps during the processes of lateral drawing and final heat treatment.

EXAMPLES

The present invention is hereinafter described specifically with reference to Examples and Comparative Examples. However, the present invention is not restricted by the Examples, carried out with appropriate modifications made to the extent adaptable to the gist of the present invention.
Sampling Method of Test Pieces of Film to be Evaluated After 1 m of film was removed from a film roll, the film surface showed up, and the first test piece of film was cut out from a central part of the film in the width direction starting from the film surface. Film samples were cut out from the central part of the film at every 100 m while the film roll was being unwound by an unwinding machine. Sampling of the test pieces of film was finished when the remaining winding length of film roll became less than 100 m, and thus obtained samples were evaluated.
Heat Shrinkage Film was cut to a square with the size of 10 cm×10 cm, and heat shrunk in hot water having the temperature of 90° C.±0.5° C. with no load for 10 seconds. Then the film dimensions in both longitudinal (the direction orthogonal to the main shrinkage direction) and width (main shrinkage direction) directions were measured, and the heat shrinkage was calculated according to the following formula (1).

With regard to fluctuation of shrinkage, an average value, a maximum value, and a minimum value were calculated using the samples obtained by the method described above.

Heat shrinkage=((length before shrinkage−length after shrinkage)/length before shrinkage)×100 (%)   Formula 1:

Composition Analysis

Each sample film was dissolved in a mixed solvent of chloroform D (Uresop Company) and trifluoroacetic acid D (Uresop Company) in the volume ratio of 10:1 to obtain a sample solution. Using NMR "GEMINI-200" (Varian, Inc.,) proton NMR was measured under the measurement conditions of 23° C. and 64 times of integration. Proton peak intensity was calculated by the NMR measurement, and the amount of isophthalic acid in 100 mol % of acid components was calculated. An average value, a maximum value, and a minimum value of component ratios of isophthalic acid (mol %) of the film samples obtained at every 100 m in longitudinal direction as described above were calculated.
Thickness Unevenness in Longitudinal Direction Film was sampled in a long roll shape with the size of 100 m in length in the longitudinal direction of film and 40 mm in width. Thickness of the film was measured at a rate of 5 m/min using a continuous contact thickness measuring instrument manufactured by Mikuron Keisokuki Co., Ltd. Thickness unevenness of film in the width direction was calculated according to the following formula (2). $T_{max.}$, $T_{min.}$, and $T_{ave.}$ represent respectively maximum thickness, minimum thickness, and average thickness of the film at the time of measurement.

Thickness unevenness=$\{(T_{max.}-T_{min.})/T_{ave.}\}\times 100$(%)   Formula 2:

Tg (Glass Transition Point)

Test piece of 5 mg of undrawn film was placed in a sample pan. The sample pan was closed with a lid, and measurement was carried out using a differential scanning calorimeter (DSC220, Seiko Instruments) in nitrogen atmosphere at a temperature rising rate of 10° C./min starting from a temperature of −40° C. to 120° C. Tg (° C.) was obtained in accordance with JIS-K 7121-1987.
Intrinsic Viscosity (IV)

In 50 ml of a mixed solvent of phenol/1,1,2,2-tetrachloroethane (weight ratio: 60/40), 0.2 g of polyester was dissolved, and intrinsic viscosity was measured at 30° C. using an Ostwald viscometer. Measurement result was expressed by the unit of dl/g.
Evaluation of Shrinkage Finishing Property Both ends of the film was adhered using dioxolane, and a label of cylindrical shape was obtained (main shrinkage direction of the heat-shrinkable polyester film was a circumferential direction). Then the label was cut into 3000 pieces of label with the diameter of 70 mm in a shrinkage direction. The label was heat shrunk to be mounted to a PET bottle 500 ml in size (diameter of body: 62 mm, minimum diameter of neck: 25 mm) using a steam tunnel (SH-1500-L) manufactured by Fuji Astec Inc at a zone temperature of 90° C. in passing time of 4 seconds. When the label was mounted, the part of the neck of 30 mm in diameter was adjusted so as to overlap one end of the label. Shrinkage finishing property was visually evaluated, and the criteria were as follows.

5: best in finishing property
4: good in finishing property
3: with less defect (2 points or less)
2: with defects (3 to 5 points)
1: with many defects (6 points or more)

Defects mentioned above include wrinkles, folding of label ends, shrinkage unevenness, and insufficient shrinkage. The film ranked as 4 or better was acceptable, and the film ranked as 3 or worse was not acceptable. Evaluation was made with 3000 samples.

Percentage of labels having defects after shrinkage finishing (%) was calculated according to the following formula.

Percentage of labels having defects after shrinkage finishing (%)=the number of samples unacceptable/total number of samples×100

Measurement of Angle of Repose

A stainless funnel having an outlet inner diameter of 18 mm was placed right above a stainless horizontal plate so that the distance (height) between the tip of the funnel and the plate became 200 mm. In the funnel, 3 kg of raw material chips were poured, and the chips were dropped from the tip onto the plate at the rate of about 50 g/min. The raw material chips dropped on the plate became stabilized by forming a conical pile. The angle between the surface of the pile and the stainless plate was measured using a protractor, and the angle was determined as angle of repose.
Preparation of Amorphous Polyester Raw Material Chips
(Polyester A)

In a stainless-steel autoclave equipped with a stirrer, a thermometer and a partially circulating cooler, 100 mol % of dimethyl terephthalate (DMT) as a dicarboxylic acid component, 55 mol % of ethylene glycol (EG) as a polyhydric alcohol component, 30 mol % of neopentyl glycol (NPG), and 15 mol % of diethylene glycol were prepared so that the amount of polyhydric alcohol became 2.2 times that of dimethyl terephthalate in a molar ratio. Then, 0.05 mol % of zinc acetate (based on the acid component) as an ester exchange catalyst and 0.225 mol % of antimony trioxide (based on the acid component) as polycondensation catalyst were added, and ester exchange reaction was carried out with methanol generated during the reaction being distilled away from the system. Thereafter, a polycondensation reaction was carried out at 280° C. under reduced pressure of 26.7 Pa to obtain polyester 1 of 0.77 dl/g of intrinsic viscosity.

Resin size of polyester A was determined as an average value calculated from the size of 100 pieces of the resin. The resin was assumed to be an elliptic cylinder shape, and a long dimeter, a short dimeter, and length (cut length of strand) of a cross section were measured using a caliper. The long diameter was 3.1 mm, the short diameter was 2.1 mm, the length was 3.3 mm, and the angle of repose was 37°. The composition, the chip size, and the angle of repose are shown in Table 1.

PET Bottle Recycled Raw Material (Polyester B)

Polyester B is the recycled raw material from PET bottles, and raw material chips of recycled raw material manufactured by Utsumi Recycle Systems Inc. were used. Isophthalic acid is contained in an amount of 2 mol % to total dicarboxylic acid component contained in the polyester. The size of the resin was measured by the same method as described above, the long dimeter was 2.9 mm, the short diameter was 2.0 mm, the length was 3.4 mm, and the angle of repose was 36°. Compared to polyester A, the long dimeter was −6%, the short diameter was −5%, and the length was +3%.

Intrinsic viscosity of polyester B was 0.68 dl/g.

Preparation of Amorphous Polyester Raw Material Chips (Polyester C)

Though polyester C was polymerized by the same method as polyester A, resin size was changed by adjusting pore size and cutter speed of strand making. Resin size of polyester C was determined by calculating the average value of 100 pieces of resin, the long dimeter was 3.8 mm, the short diameter was 2.5 mm, the length was 4.3 mm, and the angle of repose was 43°.

Compared to polyester B, the long dimeter was ±31%, the short diameter was +25%, and the length was +26%.

Intrinsic viscosity of polyester C was 0.77 dl/g.

mixed and supplied using a screw feeder into the end hopper placed right above an extruder. The resin raw materials were supplied using air, and the fine powder was remover by a cyclone type air filter. Mixing ratio of the raw materials were 70:30=polyester A:polyester B. In an end hopper, raw material chips were agitated. The type of agitating device equipped with a helical ribbon blade was employed to agitate the raw material chips. Volume of the end hopper was 190 kg, supply volume to an extruder was 500 kg per an hour, and the gradient angle of the hopper was 70°.

Mixed raw material chips were supplied to an extruder from the end hopper, and the raw material chips were molten extruded at an extrusion temperature of 280° C. using a single-screw extruder. Then the molten resin was extruded from a T-die and quenched, and the undrawn film of 135 μm in thickness was obtained. At this time, shear rate was 180 sec$^{-1}$, and glass transition temperature of the obtained undrawn film was 65° C.

The undrawn film was then introduced to a tenter, and preheated till the film temperature reached 90° C. Then the film was drawn 4.5 times in the width direction by broadening the distance between clips. Thus obtained film was introduced to the final heat treatment zone and heat treated at the film temperature of 100° C. for 6 seconds.

In the process of preheating, drawing, and final thermal treatment, fluctuations of temperature was within the range of an average temperature±0.5° C. The film was cooled after the heat treatment, and a master roll of film was obtained by continuously cutting both ends of the film and winding the film as a film roll. Thickness of the film after drawing was 30 μm.

The film master roll obtained by the process above described was made to a slitten roll of 800 mm in width and 4000 m in winding length in a slitter, and the heat-shrinkable polyester film roll was obtained.

TABLE 1

| | Composition (mol %) | | | | | Resin size (mm) | | | Angle of repose (°) | Intrinsic viscosity (dl/g) |
| | Dicarboxylic acid | | Glycol | | | Long diameter of cross section | Short diamater of cross section | | | |
| | TPA | IPA | EG | NPG | DEG | | | Length | | |
| --- | --- | --- | --- | --- | --- | --- | --- | --- | --- | --- |
| Polyester A | 100 | 0 | 55 | 35 | 15 | 3.1 | 2.1 | 3.3 | 37 | 0.77 |
| Polyester B | 98 | 2 | 100 | 0 | 0 | 2.9 | 2.0 | 3.4 | 36 | 0.68 |
| Polyester C | 100 | 0 | 55 | 35 | 15 | 3.8 | 2.5 | 4.3 | 43 | 0.77 |

TPA: Terephthalic acid
IPA: Isophthalic acid
EG: Ethylene glycol
NPG: Neopenthyl glycol
DEG: Diethylene glycol Production Method for Heat-Shrinkable Film Example 1

Raw material chips of polyester A described above were dried by evacuating at room temperature so that the moisture content became less than 100 ppm. Raw material chips of polyester B were evacuated while being heated at 150° C. so that the moisture content became less than 100 ppm. From the hoppers in which each raw material chips A or B is stored, raw material chips were separately and quantitatively The manufacturing conditions are shown in Table 2, and the evaluation results of the film of Example 1 are shown in Table 3.

As the results show, thus obtained film roll was made of the film having sufficient shrinkability in the width direction, small fluctuation of isophthalic acid ratio, small fluctuation of shrinkage in the width direction, good shrinkage finishing property, and very low level of defectiveness.

Example 2

The heat-shrinkable polyester film roll was produced by the same method as described in Example 1 except that raw material chips were not agitated in an end hopper and a cone baffle was provided instead.

The manufacturing conditions are shown in Table 2, and the evaluation results of the film of Example 2 are shown in Table 3.

As the results show, the film roll made of the film of Example 2 had sufficient shrinkability in the width direction, small fluctuation of isophthalic acid ratio, small fluctuation of shrinkage in the width direction, good shrinkage finishing property, and very low level of defectiveness.

Example 3

The heat-shrinkable polyester film roll was produced by the same method as described in Example 1 except that raw material chips of polyester A and polyester B were not agitated in an end hopper but mixed right before supplied to an extruder by using an inner pipe. Raw material chips of polyester A were supplied from the upper part of an end hopper, and raw material chips of polyester B were supplied by an inner pipe.

Inner diameter of the inner pipe was 0.2 m. In FIGS. 1 and 2, the height H1 was 5 m, the height H2 was 1.5 m, and the height H3 was 1.37 m.

The manufacturing conditions are shown in Table 2, and the evaluation results of the film of Example 3 are shown in Table 3.

As the results show, the film roll made of the film of Example 3 had sufficient shrinkability in the width direction, small fluctuation of isophthalic acid ratio, small fluctuation of shrinkage in the width direction, good shrinkage finishing property, and very low level of defectiveness.

Example 4

After the chipping of raw materials of polyester A and polyester B, the raw material chips were supplied to each hopper without being dried. Then, the raw material chips were supplied to an extruder by the same method as described in Example 2. As the extruder, a twin-screw extruder with an air vent was used, raw material chips were molten extruded from the extruder while the water contained in the chips was being removed by deaeration from the air vent. A film roll was produced in the same method as described in Example 2.

The manufacturing conditions are shown in Table 2, and the evaluation results of the film of Example 4 are shown in Table 3.

As the results show, the film roll made of the film of Example 4 had sufficient shrinkability in the width direction, small fluctuation of isophthalic acid ratio, small fluctuation of shrinkage in the width direction, good shrinkage finishing property, and very low level of defectiveness.

Example 5

Raw material chips were dried by the same method as described in Example 1, and supplied to each hopper. Raw material chips of polyester A were supplied to twin-screw extruder 1 having an air vent without the mixing step of raw chips in the hopper. Raw material chips of polyester B were supplied to twin-screw extruder 2, and the extruders 1 and 2 were arranged so that the molten resin of polyester B discharged from the tip of twin-screw extruder 2 was side fed in the midway of twin-screw extruder 1. Raw material chips of polyester A and polyester B were supplied from each hopper to the extruders by the amount being quantified by screw feeders. The rotating speed of the screw feeders was adjusted so that mixing ratio of raw materials became 70:30=polyester A:polyester B. Twin-screw extruder 1 had a vent designed to be provided at a meeting point with the resin supplied from twin-screw extruder 2, and deaeration was executed from the vent. Polyester A and polyester B were mixed inside of twin-screw extruder 1 and molten extruded, and the molten resin was extruded from a T-die and quenched to obtain undrawn film.

After that, the same production method as Example 1 was employed for film production.

The manufacturing conditions are shown in Table 2, and the evaluation results of the film of Example 5 are shown in Table 3.

As the results show, the film roll made of the film of Example 5 had sufficient shrinkability in the width direction, small fluctuation of isophthalic acid ratio, small fluctuation of shrinkage in the width direction, good shrinkage finishing property, and very low level of defectiveness.

Example 6

Film was produced by the same method as Example 5 except that the mixing ratio of polyester raw materials, was changed to 80:20=polyester A:polyester B, lateral drawing temperature in a tenter was changed to 87° C., and the temperature of final heat treatment was changed to 96° C. Thus obtained undrawn film had Tg of 62° C. and the thickness of 135 μm, and the thickness of the film after drawing was 30 μm.

The manufacturing conditions are shown in Table 2, and the evaluation results of the film of Example 6 are shown in Table 3.

As the results show, the film roll made of the film of Example 6 had sufficient shrinkability in the width direction, small dispersion of isophthalic acid ratio, small fluctuation of shrinkage in the width direction, good shrinkage finishing property, and very low level of defectiveness.

Example 7

Film was produced in the same method as Example 5 except that the mixing ratio of polyester raw materials was changed to 60:40=polyester A:polyester B, lateral drawing temperature in a tenter was changed to 94° C., and the temperature of final heat treatment was changed to 103° C. Thus obtained undrawn film had Tg of 69° C. and the thickness of 135 μm, and the thickness of the film after drawing was 30 μm.

The manufacturing conditions are shown in Table 2, and the evaluation results of the film of Example 7 are shown in Table 3.

As the results show, the film roll made of the film of Example 7 had sufficient shrinkability in the width direction, small fluctuation of isophthalic acid ratio, small fluctuation of shrinkage in the width direction, good shrinkage finishing property, and very low level of defectiveness.

Comparative Example 1

Raw material chips of polyester B and polyester C were mixed in the mixing ratio of 30:70=polyester B:polyester C insider of an end hopper. A film roll was produced by the same method as described in Example 2 except the polyester raw material B and C were used in Comparative Example 1.

The manufacturing conditions are shown in Table 2, and the evaluation results of the film of Comparative Example 1 are shown in Table 3.

As the evaluation results show, the film of Comparative Example 1 had sufficient shrinkage in the width direction, however, the uneven distribution of raw materials occurred due to the large size difference of polyester raw material chips B and C, and the significant difference of the angle of repose of the chips. As a result, the film of Comparative Example 1 had largely fluctuated isophthalic acid ratio, and largely fluctuated shrinkage both in the width and longitudinal directions. These defects brought that the film of Comparative Example 1 had good shrinkage finishing property in some cases, but the film roll had high defect rates on the whole.

Comparative Example 2

Film of Comparative Example 2 was produced by the same method as described in Example 2 except that the amount of supply to an extruder was changed to 120 kg per hour.

The manufacturing conditions are shown in Table 2, and the evaluation results of the film of Comparative Example 2 are shown in Table 3.

As the evaluation results show, the film of Comparative Example 2 had sufficient shrinkage in the width direction, however, uneven distribution of raw materials occurred due to too long retention time of raw materials in an end hopper. As a result, the film of Comparative Example 2 had largely fluctuated isophthalic acid ratio and largely fluctuated shrinkage both in the width and longitudinal directions. These defects brought that the film of Comparative Example 2 had good shrinkage finishing property in some cases, but the film roll had high defect rates on the whole.

Comparative Example 3

The film of Comparative Example 3 was produced by the same method as described in Example 2 except that the gradient angle of an end hopper was change to 50°.

The manufacturing conditions are shown in Table 2, and the evaluation results of the film of Comparative Example 3 are shown in Table 3.

As the evaluation results show, the film of Comparative Example 3 had sufficient shrinkage in the width direction, however, uneven distribution of raw materials occurred due to too small gradient angle. As a result, the film of Comparative Example 3 had largely fluctuated isophthalic acid ratio and largely fluctuated shrinkage both in the width and longitudinal directions. These defects brought that the film of Comparative Example 3 had good shrinkage finishing property in some cases, but the film roll had high defect rates on the whole.

Comparative Example 4

The film of Comparative Example 4 was produced by the same method as describe in Example 3 except that the height of the inner pipe H2 was changed to 7 m. The height H3 was 6.87 m.

The manufacturing conditions are shown in Table 2, and the evaluation results of the film of Comparative Example 4 are shown in Table 3.

As the evaluations show, the film of Comparative Example 4 had sufficient shrinkage in the width direction, however, uneven distribution of raw materials occurred since the inner pipe did not satisfy the formulas 3 and 4. As a result, the film of Comparative Example 4 had largely fluctuated isophthalic acid ratio and largely fluctuated shrinkage both in the width and longitudinal directions. These defects brought that the film of Comparative Example 4 had good shrinkage finishing property in some cases, but the film roll had high defect rates on the whole.

TABLE 2

| | | | Example 1 | Example 2 | Example 3 | Example 4 | Example 5 | Example 6 |
|---|---|---|---|---|---|---|---|---|
| Conditions of mixing to extrusion of raw materials | Mixing ratio (mass %) | Polyester A | 70 | 70 | 70 | 70 | 70 | 80 |
| | | Polyester B | 30 | 30 | 30 | 30 | 30 | 20 |
| | | Polyester C | 0 | 0 | 0 | 0 | 0 | 0 |
| | Angle of repose (°) | Maximum − minimum | 1 | 1 | 1 | 1 | 1 | 1 |
| | Drying step of raw material chips | Polyester A | with drying | with drying | with drying | w/o drying | with drying | with drying |
| | | Polyester B | with drying | with drying | with drying | w/o drying | with drying | with drying |
| | | Polyester C | — | — | — | — | — | — |
| | End hopper (mixing) | Volume (kg) | 190 | 190 | 190 | 190 | — | — |
| | | Discharging amount (kg/h) | 500 | 500 | 500 | 500 | — | — |
| | | Inclination angle (°) | 70 | 70 | 70 | 70 | — | — |
| | | Agitation | conducted | N/A | N/A | N/A | — | — |
| | | Baffle | N/A | used | N/A | used | — | — |
| | | Inner pipe | N/A | N/A | used | N/A | — | — |
| | Inner pipe | Inner diameter L (m) | — | — | 0.2 | — | — | — |
| | | Height H1 (m) | — | — | 5 | — | — | — |
| | | Height H2 (m) | — | — | 1.5 | — | — | — |
| | | Height H3 (m) | — | — | 1.37 | — | — | — |
| | Mixing by side feeder | | N/A | N/A | N/A | N/A | conducted | conducted |
| | Extruder | | uniaxial | uniaxial | uniaxial | biaxial | biaxial (two extruders) | biaxial (two extruders) |
| Thickness of undrawn film (μm) | | | 135 | 135 | 135 | 135 | 135 | 135 |

TABLE 2-continued

| | | | | | | | |
|---|---|---|---|---|---|---|---|
| Tenter conditions | Film temperature at lateral drawing (° C.) | 90 | 90 | 90 | 90 | 90 | 87 |
| | Lateral drawing ratio | 4.5 | 4.5 | 4.5 | 4.5 | 4.5 | 4.5 |
| | Film temperature at final heat treatment (° C.) | 100 | 100 | 100 | 100 | 100 | 96 |
| | Time for final heat treatment (s) | 6 | 6 | 6 | 6 | 6 | 6 |
| Slitting conditions | Film roll width (mm) | 800 | 800 | 800 | 800 | 800 | 800 |
| | Winding length (m) | 4000 | 4000 | 4000 | 4000 | 4000 | 4000 |

| | | | Example 7 | Comparative Example 1 | Comparative Example 2 | Comparative Example 3 | Comparative Example 4 |
|---|---|---|---|---|---|---|---|
| Conditions of mixing to extrusion of raw materials | Mixing ratio (mass %) | Polyester A | 60 | 0 | 70 | 70 | 70 |
| | | Polyester B | 40 | 30 | 30 | 30 | 30 |
| | | Polyester C | 0 | 70 | 0 | 0 | 0 |
| | Angle of repose (°) | Maximum − minimum | 1 | 7 | 1 | 1 | 1 |
| | Drying step of raw material chips | Polyester A | with drying | — | with drying | with drying | with drying |
| | | Polyester B | with drying | with drying | with drying | with drying | with drying |
| | | Polyester C | — | with drying | — | — | — |
| | End hopper (mixing) | Volume (kg) | — | 190 | 190 | 190 | 190 |
| | | Discharging amount (kg/h) | — | 500 | 120 | 500 | 500 |
| | | Inclination angle (°) | — | 70 | 70 | 50 | 70 |
| | | Agitation | — | N/A | N/A | N/A | N/A |
| | | Baffle | — | used | used | used | N/A |
| | | Inner pipe | — | N/A | N/A | N/A | used |
| | Inner pipe | Inner diameter L (m) | — | — | — | — | 0.2 |
| | | Height H1(m) | — | — | — | — | 5 |
| | | Height H2(m) | — | — | — | — | 7 |
| | | Height H3(m) | — | — | — | — | 6.87 |
| | Mixing by side feeder | | conducted | N/A | N/A | N/A | N/A |
| | Extruder | | biaxial (two extruders) | uniaxial | uniaxial | uniaxial | uniaxial |
| | Thickness of undrawn film (μm) | | 135 | 135 | 135 | 135 | 135 |
| Tenter conditions | Film temperature at lateral drawing (° C.) | | 94 | 90 | 90 | 90 | 90 |
| | Lateral drawing ratio | | 4.5 | 4.5 | 4.5 | 4.5 | 4.5 |
| | Film temperature at final heat treatment (° C.) | | 103 | 100 | 100 | 100 | 100 |
| | Time for final heat treatment (s) | | 6 | 6 | 6 | 6 | 6 |
| Slitting conditions | Film roll width (mm) | | 800 | 800 | 800 | 800 | 800 |
| | Winding length (m) | | 4000 | 4000 | 4000 | 4000 | 4000 |

TABLE 3

| | | | Example 1 | Example 2 | Example 3 | Example 4 | Example 5 | Example 6 | Example 7 |
|---|---|---|---|---|---|---|---|---|---|
| | Film thickness (μm) | | 30 | 30 | 30 | 30 | 30 | 30 | 30 |
| Shrinkage at 90° C. (%) | Width direction | Average value | 63.2 | 63.1 | 62.1 | 61.8 | 63.1 | 75.1 | 49 |
| | | Maximum value | 64.5 | 64.2 | 64.2 | 63.1 | 64.4 | 76.2 | 50.2 |
| | | Minimum value | 62.1 | 62.8 | 61.1 | 60.9 | 61.9 | 73.9 | 47.8 |
| | | Maximum value minus average value | 1.3 | 1.1 | 2.1 | 1.3 | 1.3 | 1.1 | 1.2 |
| | | Average value minus minimum value | 1.1 | 0.3 | 1 | 0.9 | 1.2 | 1.2 | 1.2 |
| | Longitudinal direction | Average value | 11.4 | 11.2 | 10.9 | 11 | 10 | 13.2 | 7.7 |
| | | Maximum value | 12.5 | 12.2 | 11.8 | 12.3 | 11.2 | 14.2 | 8.2 |
| | | Minimum value | 10.2 | 10.8 | 9.3 | 9.5 | 8.8 | 11.8 | 6.4 |
| | | Maximum value minus average value | 1.1 | 1 | 0.9 | 1.3 | 1.2 | 1 | 0.5 |
| | | Average value minus minimum value | 1.2 | 0.4 | 1.6 | 1.5 | 1.2 | 1.4 | 1.3 |
| Isophthalic acid ratio (mol %) | | Average value | 0.62 | 0.62 | 0.61 | 0.62 | 0.6 | 0.42 | 0.8 |
| | | Maximum value | 0.81 | 0.8 | 0.79 | 0.81 | 0.79 | 0.51 | 0.91 |
| | | Minimum value | 0.49 | 0.49 | 0.5 | 0.5 | 0.48 | 0.39 | 0.68 |
| | | Maximum value minus average value | 0.19 | 0.18 | 0.18 | 0.19 | 0.19 | 0.09 | 0.11 |
| | | Average value minus minimum value | 0.13 | 0.13 | 0.11 | 0.12 | 0.12 | 0.03 | 0.12 |
| Thickness unevenness | Longitudinal direction (%) | | 8.9 | 9 | 8.8 | 8.9 | 8.9 | 9.3 | 8.5 |
| Finishing property | Defect rates (%) | | 0 | 0 | 0 | 0 | 0 | 0 | 0 |

TABLE 3-continued

|  |  |  | Comparative Example 1 | Comparative Example 2 | Comparative Example 3 | Comparative Example 4 |
|---|---|---|---|---|---|---|
|  | Film thickness (μm) |  | 30 | 30 | 30 | 30 |
| Shrinkage at 90° C. (%) | Width direction | Average value | 62 | 61 | 60.9 | 61.1 |
|  |  | Maximum value | 65.9 | 64.1 | 64.3 | 64.2 |
|  |  | Minimum value | 57.7 | 57.2 | 57.7 | 57.7 |
|  |  | Maximum value minus average value | 3.9 | 3.1 | 3.4 | 3.1 |
|  |  | Average value minus minimum value | 4.3 | 3.8 | 3.2 | 3.4 |
|  | Longitudinal direction | Average value | 10.9 | 10.1 | 10.3 | 10.8 |
|  |  | Maximum value | 14.3 | 13.4 | 13.5 | 13.9 |
|  |  | Minimum value | 6.3 | 6.4 | 7.1 | 7.6 |
|  |  | Maximum value minus average value | 3.4 | 3.3 | 3.2 | 3.1 |
|  |  | Average value minus minimum value | 4.6 | 3.7 | 3.2 | 3.2 |
| Isophthalic acid ratio (mol %) |  | Average value | 0.61 | 0.62 | 0.61 | 0.61 |
|  |  | Maximum value | 0.95 | 0.93 | 0.94 | 0.93 |
|  |  | Minimum value | 0.25 | 0.2 | 0.22 | 0.25 |
|  |  | Maximum value minus average value | 0.34 | 0.31 | 0.33 | 0.32 |
|  |  | Average value minus minimum value | 0.36 | 0.42 | 0.39 | 0.36 |
| Thickness unevenness | Longitudinal direction (%) |  | 11.5 | 11.2 | 12.8 | 10.4 |
| Finishing property | Defect rates (%) |  | 12 | 13 | 11 | 8 |

INDUSTRIAL APPLICABILITY

The heat-shrinkable polyester film roll of the present invention has significantly decreased fluctuation of shrinkage property in both width and longitudinal directions due to small variation of composition in the longitudinal direction of the film roll even though the film roll contains prescribed amount of recycled raw material from a PET bottle as described above and the film roll has high shrinkage property in the width direction. Therefore, the heat-shrinkable polyester film roll can be used with very low rates of defects such as wrinkles and distortion when the film roll is continuously processed to beverage labels and shrinkage finished.

The invention claimed is:

1. A film roll of a heat-shrinkable polyester film, wherein a polyester of the polyester film contains 5 mass % or more and 50 mass % or less of recycled raw material from a PET bottle and an acid component of the polyester comprises isophthalic acid, and
the film roll satisfies the following requirements (1) to (3):
(1) an average value of a shrinkage in a main shrinkage direction of the film samples collected at every 100 m in a longitudinal direction of the film roll is 40% or more when the film samples are soaked in hot water of 90° C. for 10 seconds, and each of the shrinkage of the film samples is within ±3% of the average value;
(2) isophthalic acid ratio in 100 mol % of whole acid components contained in polyester constituting each of the film samples collected at every 100 m in a longitudinal direction of the film roll is within +0.3 mol % of an average value of isophthalic acid ratio of all the film samples, wherein the average value of isophthalic acid ratio is 0.3 mol % or more and 3.0 mol % or less in 100 mol % of the whole acid components in polyester of the film samples collected at every 100 m in the longitudinal direction of the film roll; and
(3) the film roll satisfies thickness unevenness of 20% or less in the longitudinal direction of the film roll.

2. The heat-shrinkable polyester film roll according to claim 1, wherein the heat-shrinkable polyester film comprises at least recycled raw material from the PET bottle and a mixture of one or more kinds of a polymer chip of different composition.

3. The heat-shrinkable polyester film roll according to claim 1, wherein the polyester of the heat-shrinkable polyester film comprises ethylene terephthalate as a main constituent component.

4. The heat-shrinkable polyester film roll according to claim 2, wherein the polyester of the heat-shrinkable polyester film comprises ethylene terephthalate as a main constituent component.

* * * * *

UNITED STATES PATENT AND TRADEMARK OFFICE
CERTIFICATE OF CORRECTION

PATENT NO. : 12,497,506 B2
APPLICATION NO. : 17/772054
DATED : December 16, 2025
INVENTOR(S) : Masafumi Inoue et al.

Page 1 of 1

It is certified that error appears in the above-identified patent and that said Letters Patent is hereby corrected as shown below:

In the Claims

Claim 1, at Column 26, Line 31: "within +0.3 mol %" should be "within ±0.3 mol %"

Signed and Sealed this
Tenth Day of February, 2026

John A. Squires
*Director of the United States Patent and Trademark Office*